United States Patent [19]

Mori et al.

[11] 4,312,824
[45] Jan. 26, 1982

[54] PROCESS FOR MAKING CLOSURE CAPS HAVING LINERS

[75] Inventors: Fumio Mori, Yokohama; Junichi Itsubo, Hiratsuka; Gunji Matsuda, Isehara; Toru Hirano; Hideki Sato, both of Hiratsuka, all of Japan

[73] Assignee: Toyo Seikan Kaisha, Ltd., Tokyo, Japan

[21] Appl. No.: 154,875

[22] Filed: May 30, 1980

[30] Foreign Application Priority Data

Jun. 8, 1979 [JP] Japan ..................... 54-71148

[51] Int. Cl.³ .................................. B29C 13/02
[52] U.S. Cl. ......................... 264/135; 264/25; 264/26; 264/268; 425/809
[58] Field of Search ............ 264/268, 25, 26, 135; 425/809, 174.8 R, 174.8 E

[56] References Cited

U.S. PATENT DOCUMENTS

| | | | |
|---|---|---|---|
| 3,212,131 | 10/1965 | Aichele | 425/808 |
| 3,493,453 | 2/1970 | Ceresa et al. | 264/268 |
| 4,081,503 | 3/1978 | Shotbolt | 264/268 |

FOREIGN PATENT DOCUMENTS

| | | |
|---|---|---|
| 41-5588 | 3/1966 | Japan . |
| 48-5706 | 2/1973 | Japan . |
| 1112023 | 5/1968 | United Kingdom ......... 264/268 |

*Primary Examiner*—James B. Lowe
*Attorney, Agent, or Firm*—Pennie & Edmonds

[57] ABSTRACT

A process for manufacturing a closure cap having a liner. A mass of molten thermoplastic is positioned in the inner face of a cap shell. The mass is spread by a heated punch and the spread mass is then formed by a cooled punch to the final liner shape.

8 Claims, 6 Drawing Figures

# 4,312,824

PROCESS FOR MAKING CLOSURE CAPS HAVING LINERS

TECHNICAL FIELD

The present invention relates to a process for making closure caps having liners. More particularly the invention relates to a process for the preparation of closure caps having liners which are excellent in resistance to degradation of the adhesion of the liners with the caps over a long period of time and which have in combination good sealing, openability and sanitary properties.

BACKGROUND ART

Closure caps including crown and container caps having a liner or packing of rubber, resin, paper or cork have heretofore been widely used as closures for sealed bottled products. Those closure caps provided with a liner of low density polyethylene or a vinyl chloride resin are excellent in that the liner has good shapability and sealing properties and does not change the flavor or taste of the bottled drink or the like. Moreover, the manufacturing costs of these closure caps are relatively small. Accordingly, the demand for these closure caps has recently been increasing.

One known process for making such closure caps comprises supplying a mass of a melt of a thermoplastic resin to the inner face side of a closure shell, pressing the supplied mass between a cooled pressing mold and the closure shell and thus forming a liner (see Japanese Patent Publication No. 5588/66). Another known process comprises supplying a preformed thermoplastic resin to the inner side face of a closure shell, heating the closure shell to soften the thermoplastic resin, pressing the softened resin between a cooled pressing mold and the closure shell and thus forming a liner (see Japanese Patent Publication No. 5706/73).

Liners should be tightly stuck to and engage with the open mouth portions of containers. Accordingly, it is preferred that one or a plurality of annular projections or concave grooves be formed on the peripheral portion of a liner to be engaged with the open mouth portion of a container.

Conventional press molding processes for the preparation of liners are advantageous in that the operation of molding a mass of a thermoplastic resin into a liner and the operation of sticking the liner to a closure shell can be performed simultaneously. However, it has been found that these liners are often inferior to disc-like packings or liners formed by punching out discs from sheets of liner material especially in sealing and adhesion properties.

More specifically, when a closure cap provided with a liner formed by press molding is used for sealing a bottled product, micro-cracks may form in the liner, especially at the peripheral portion. This cracking may result from the compression force applied to the liner during capping, from contact with the contents of the bottle or the vapor of the contents and from sterilization or pasteurizing steps. The result is that adhesion of the liner with the shell degrades over a period of time. This is particularly true with closures used with containers having a wide mouth, where the operation of the press-molding of a liner is carried out at a high speed or when the liners have annular projections or concave grooves on their peripheral portions.

It is therefore an object of our invention to provide for a resin liner formed by press-molding which will have a satisfactory sealing property, have a high peel strength and have a high resistance to heat treatment.

DISCLOSURE OF INVENTION

We have found that during the step of forming a resin liner by press molding, the resin is spread and molded under cooling conditions such that a molecular orientation occurs on the surface of the liner, especially in the peripheral portion. We have found that if resin supplied into a closure shell is spread onto the inner face of the shell while it is kept in the molten state that the resin is then molded whereby molecular orientation on the surface of the liner or build up of a residual stress in the liner can be inhibited to reduce occurrence of stress cracking or degradation of the adhesion over a period of time. The result is that the sealing property and peel resistance of such liners can be remarkably improved and a high sealing property can be retained even after heat treatment.

We also have found that when this molding process is applied to the manufacture of closure caps having a large diameter by using a thermoplastic resin composition containing a lubricant, there can be obtained a closure cap which has in the liner a novel lubricant distribution structure that is not observed in any of the conventional liner-provided closure caps. More specifically in this type of closure cap, lubricant is distributed predominantly by blooming on the surface of the thick peripheral portion of the liner which exerts a sealing action with the edges of the open mouth portion of a container. Accordingly, migration of the lubricant to the contents of the container from the central portion of the liner, which is in contact with the contents, can be substantially inhibited while the opening torque is remarkably reduced and the ease of opening the closure cap is highly improved.

In accordance with one aspect of the present invention, there is provided a process for the preparation of a closure cap which comprises locating a melt of a thermoplastic resin for formation of a liner in a shell of a closure cap, pressing the melt by a punch maintained at a high temperature to spread the melt on the inner face of the closure shell and press molding the spread melt by a cooled punch to form the resin into a final liner.

In accordance with another aspect of the present invention, there is provided a process for the preparation of a closure having a liner which comprises locating a melt of a thermoplastic resin for containing a lubricant for formation of a liner in a shell of a wide mouthed container, pressing the melt by a punch maintained at a high temperature to spread the melt on the inner face of the closure shell and press molding the spread melt by a cooled punch to form a liner in which the thickness of the sealing peripheral portion is larger than the thickness of the central portion and in which the lubricant is predominantly distributed by blooming on the surface of the peripheral portion.

DETAILED DESCRIPTION OF THE PREFERRED EMBODIMENTS

Figure 1:
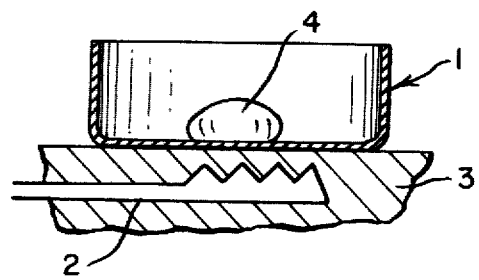
FIG. 1 is a schematic drawing illustrating the step of heating molten resin in a shell of a closure cap according to the present invention.

Referring to FIG. 1 there is illustrated a wide mouthed closure shell 1 supported by an anvil 3 heated by a heating mechanism such as an electric heater 2. A mass 4 of a molten resin is supplied and positioned in the interior of the closure shell 1 through a die and rotary cutter of an extruder (not shown). In the alternative a mass of a solidified resin or a mass of a resin preheated to a temperature lower than the melting temperature of the resin may be supplied into the shell 1 and heated in the shell by an appropriate heating means such as an electric induction heater, an infrared heater or an oven heater to form a molten or softened resin mass. It is preferred that the resin mass 4 be in a state by which it will adhere to the shell 1 upon heating.

Figure 2:
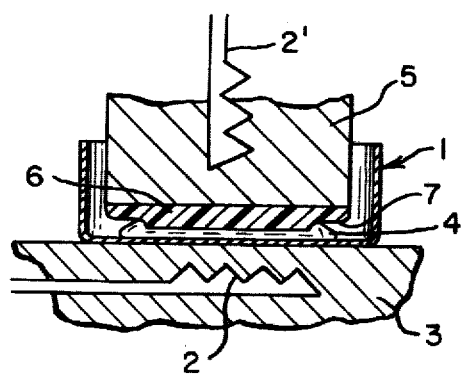
FIG. 2 is a drawing illustrating the step of spreading molten resin by a hot punch according to the present invention.

The shell 1 having the mass 4 of the molten resin is fed to a melt spreading operation (hot pressing operation) station shown in FIG. 2. The shell 1 is supported by an anvil 3 heated by a heating mechanism 2 and a press mold 5 (punch) located above the anvil 3 is brought down to press the melt 4 and spread it on the inner face of the shell. In order to spread the resin in the molten state, the punch 5 should be maintained at a high temperature. Accordingly, a heating mechanism such as an electric heater 2' is disposed in the punch 5.

In order to prevent the resin melt 4 from adhering to the punch 5, the surface of the punch is provided with a layer 6 of a parting substance in at least the portion of the punch falling in contact with the resin.

Figure 3:
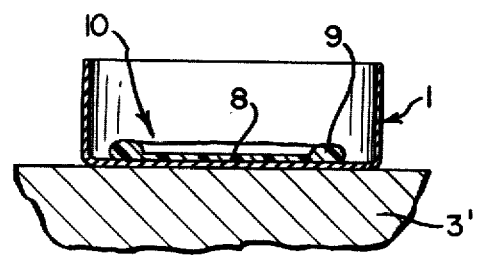
FIG. 3 is a sectional view illustrating the resin after it has been spread to form a closure cap.

In the case where a thick portion of a seal is formed on the periphery of the liner, a punch 5 having a stepped notch or concave portion 7 on the periphery of the pressing face (operating face) is used, and preferably, a resin article 10 having a thin central portion 8 and a thick peripheral portion 9 as shown in FIG. 3 is prepared.

Figure 4:
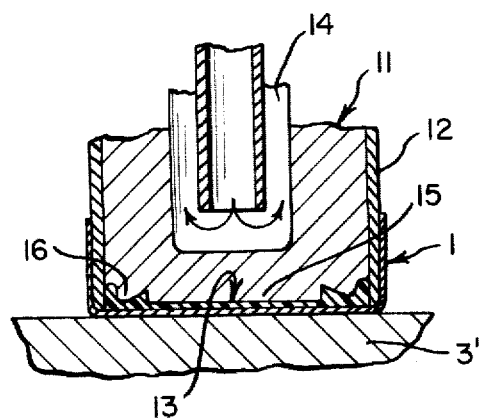
FIG. 4 is a drawing illustrating the step of press molding spread molten resin in a process according to the invention.

The shell 1 having the preformed article 10 of the resin melt is then supplied to a cold molding (cold press) operation station shown in FIG. 4 and the shell 1 is supported by an anvil 3' which is not heated. A press mold 11 (punch) and a sleeve 12, which are located above the anvil 3', are brought down to mold the preformed article 10 to a final liner 13. A cooling mechanism 14 is arranged in the press mold 11. A flat or smoothly curved central surface portion 15 is included on the pressing face of the mold 11 for forming a thin central portion of the liner and a peripheral annular concave or notched portion 16 is included on the mold for forming a thick peripheral sealing portion of the liner.

Referring to FIG. 4, the sleeve 12 is first engaged with the inner circumferential edge of the skirt of the shell to fix the shell 1 tightly. The press mold 11 is then promptly brought down to press the preformed article 10 of the molten resin. Thus, the preformed resin is completely press molded into a liner 13 and this pressing state is maintained for a certain time and the liner 13 as a whole is gradually cooled in the press mold 11 and if necessary by a cooling mechanism (not shown) disposed in the anvil 3' whereby a solidified liner is obtained. The sleeve 12 and press mold 11 are raised and a closure cap provided with a liner 13 is withdrawn. The press mold is advantageously cooled by ordinary city water or chilled water. Of course, other gaseous or liquid cooling medium may be used for cooling the press mold.

It is very important in the present invention that the resin should be spread in the shell 1 while keeping it in the molten state by the heated press mold 5 in order to prepare a preformed article 10 of the molten resin and this preformed molten resin should then be press molded under cooling conditions. This is to ensure reduction of molecular orientation of the surface of the liner and to effectively eliminate residual stress in the liner.

In the conventional process of preparation of closure caps having liners, a mass of a molten thermoplastic resin is pressed while it is cooling and the resin mass is simultaneously spread to a predetermined shape. In-plane orientation owing to plastic deformation inevitably occurs in the surface of the liner when it is later brought into contact with the surface of the press mold. This inplane orientation is prominent in the peripheral portion of the liner and is larger than in the central portion where the degree of deformation is low. When an annular projection seal is formed on the peripheral portion of the liner in order to engage with the mouth portion of a bottle, it is necessary that the surface configuration of the liner precisely register with the surface configuration of the press mold. This is done by forcibly cooling the press mold by a low temperature cooling medium to reduce its surface temperature to as low a level as possible and also by controlling the pressing speed of the press mold to a level as low as possible. Acccordingly, in this case, the degree of the molecular in-plane orientation in the sealing peripheral portion of the liner is especially enhanced.

Cracks are not formed in liners when produced where a great difference is observed between the value of the in-plane orientation index in the central portion of the liner and the value of the in-plane orientation index in the peripheral portions as illustrated in Comparative Examples described hereinafter. However when the liners are subjected to an accelerated cracking resistance test, cracks are formed in a very short time and when the liner is applied to seal a bottled product and is subjected to a pressure resistance test, cracks are formed at a very high frequency by the compressive force, by the contact with the contents and by the temperature conditions.

In the conventional process since spreading and thermal bonding of the resin are simultaneously carried out while cooling, it is often difficult to attain uniform and sufficient bonding between the liner and the shell and it is impossible to prevent residual stress from being formed in the liner bonded to the shell. Although a sufficient bonding strength is obtained in the liner when initially prepared using the conventional process, a drastic degradation of the adhesion of the liner to the shell occurs over a period of time due to storage, transportation and bottle sealing tests and also because of the residual stresses remaining in the liner which can result in the liner falling from the shell.

According to the present invention and by performing the above-mentioned operations using a hot press, molecular orientation in the entire surface of the liner, especially in the peripheral seal portion, can be inhibited and the liner can be thermally bonded to the shell uniformly and sufficiently without production of residual stress. Therefore, in the accelerated cracking test, the 50% crack forming time can be prolonged to more than five times that of the conventional product and, in the heat resistance test in an actual bottle environment, formation of cracks can be completely prevented and failure of the liner because of any degradation of the adhesion over a period of time is eliminated.

In the present invention, the punch used in the hot press step for melting and spreading the resin is maintained at a high temperature. The term "high temperature" is meant to include a temperature at which the resin melt brought into contact with the punch is kept in the molten state. In order to maintain this state, it is preferred that the effective surface temperature of the punch be higher than the Vicat temperature of the resin (as determined according to ASTM D-1525).

From the viewpoints of the parting property and mechanical characteristics, a fluorine resin, especially polytetrafluoroethylene, is preferred as the parting substance for preventing sticking of the molten resin to the heated punch. Other parting substances such as silicone resins may be used. The punch may be formed completely of such parting substance or only the surface portion of the punch may be coated with the parting substance.

A metal foil having a thickness of 1 to 100 microns, preferably 5 to 100 microns, or a metal sheet having a thickness larger than 100 microns, may be used as the material constituting the closure cap shell. The kind of the metal material is not particularly critical and foils and sheets of non-surface-treated steel (black plate), surface treated steel and light metals such as aluminum may be used. Suitable examples of surface treated steel include steel foils or sheets in which surfaces are subjected to a chemical treatment such as a phosphoric acid treatment or a chromic acid treatment, an electrolytic treatment such as an electrolytic chromic acid treatment, an electrolytic tin plating treatment or a melting plating treatment such as a melting tin plating treatment.

At least one layer of a known protective paint or a primer paint for thermal bonding of a liner may be optionally included on the surface of such metal material. At least one member selected from phenol-epoxy paints, epoxy-urea paints, epoxy-melamine paints, phenol-epoxy-vinyl paints, epoxy-vinyl paints, vinyl chloride-vinyl acetate copolymer paints, vinyl chloride-vinyl acetate-maleic anhydride copolymer paints, unsaturated polyester paints and saturated polyester resins is preferably used as the protective paint. In the case where the protective paint is not adhesive to a thermoplastic resin for the liner, a paint for thermal bonding of the liner may be applied to the metal substrate directly or through a protective paint such as mentioned above. For example, when the liner forming resin is an olefin resin, a known paint for thermal bonding of olefin resins, such as a paint comprising oxidized polyethylene or acid-modified olefin dispersed in a film forming resin, may be advantageously used. If the liner forming resin is a vinyl chloride resin, a vinyl resin paint or modified vinyl resin paint such as mentioned above may be used.

Such a coated metal substrate is formed into a closure shell having an optional shape, such as a crown, a pilferproof cap, a screw cap, a twist-off cap, a lug cap or an easy-open cap. The process of the present invention is especially advantageously applied to the manufacture of wide-mouthed closure caps and according to the process of the present invention, a liner can be advantageously formed on a closure cap shell having a diameter larger than 38 mm, to which application of a liner is difficult according to the conventional cold pressing process using molten polyethylene. Of course, the process of the present invention can be conveniently applied to closure caps having a smaller diameter.

Any of thermoplastic resins which are melt moldable and have a cushioning property required for the liner can be used as the liner forming thermoplastic resin in the present invention. At least one member selected from olefin resins such as polyethylene, polypropylene, ethylene-propylene copolymers, ethylene-vinyl acetate copolymers, ethylene-acrylic acid ester copolymers and ionomers is especially advantageously used as the thermoplastic resin in the present invention. Other soft vinyl chloride resins may be used.

The thermoplastic resin especially suitable for attaining the objects of the present invention is low density polyethylene or an ethylene-containing copolymer. From the viewpoint of the characteristics of the resulting liner, it is preferred to blend at least one member selected from (a) an ethylene-propylene copolymer and (b) a thermoplastic elastomer, especially a styrenediene (butadiene or isoprene)-styrene copolymer into a low density polyethylene. It is preferred that such modifying component be incorporated in an amount of 3 to 40% by weight based on low density polyethylene.

The process of the present invention has the advantage in that a thermoplastic resin having a low melt flowability, which cannot be processed easily according to the conventional process, can be conveniently used for formation of a liner. For example, polyethylene having a small melt index (M.I.) has inherently a small tendency to undergo stress cracking, and when a liner is formed from such polyethylene using the conventional process, in-plane orientation becomes excessive in the peripheral portion of the liner and stress cracking inevitably occurs. In contrast, if the resin is spread in the molten state according to the present invention, polyethylene having inherently a small tendency to undergo stress cracking can be used. This is another advantage attained by the present invention. It is ordinarily preferred that the melt index of low density polyethylene be in the range of from 0.1 to 20 g/10 min.

In order to reduce the opening torque and improve openability of the cap, it is preferred to incorporate a lubricant into the thermoplastic resin used in the present invention.

Examples of lubricant appropriately used are as follows, although other lubricants can be used.
(1) Aliphatic hydrocarbon type lubricants such as liquid paraffin, white mineral oil of the industrial grade, synthetic paraffin, petroleum wax and non-odorous light hydrocarbon.
(2) Silicone type lubricants such as organopolysiloxane.
(3) Fatty acids, aliphatic alcohols and higher fatty acids having 8 to 22 carbon atoms, such as fatty acids prepared from animal or vegetable oils and fats or products obtained by hydrogenation of these fatty acids, hydroxystearic acid, linear aliphatic monohydric alcohols having at least 4 carbon atoms, which are obtained by reducing an animal or vegetable oil and fat or a fatty acid ester thereof or by fractional decomposition of a natural wax, and dodecyl alcohol.

(4) Polyglycol type lubricants such as polyethylene glycol having a molecular weight of 200 to 9,500, polypropylene glycol having a molecular weight of at least 1,000 and polyoxypropylene-polyoxyethylene block copolymer having a molecular weight of 1,900 to 9,000.

(5) Amine or amine type lubricants such as higher fatty acid amide, oleyl palmitamide, 2-stearamido-ethyl stearate, styrene-bis-fatty acid amide, N,N'-oleyl-stearylethylene diamine, N,N'-bis-(2-hydroxyethyl)-alkyl amide having 12 to 18 carbon atoms in the alkyl moiety, N,N'-bis-(hydroxyethyl)-lauramide, a reaction product of oleic acid with an N-alkyo-trimethylene diamine having 16 to 18 carbon atoms in the alkyl moiety and a steric acid diester of di-(hydorxyethyl)-diethylene triamine monoacetate.

(6) Fatty acid esters of monohydric and polyhydric alcohols such as n-butyl stearate, methyl ester of hydrogenated rosin, di-n-butyl sebacate, 2-ethylhexyl sebacate, di-n-octyl sebacate, glycerin fatty acid esters, glyceryl lactosterate, pentaerythritol stearate, pentaerythritol tetrasterate, sorbitan fatty acid esters, polyethylene glycol fatty acid esters, polyethylene glycol monostearate, polyethylene glycol dilaurate, polyethylene glycol monooleate, polyethylene glycol dioleate polyethylene glycol coconut fatty acid ester, polyethylene glycol tall oil fatty acid ester, ethane diol montanate, 1,3-butane diol montanate, diethylene glycol stearate and propylene glycol fatty acid esters.

(7) Triglycerides and waxes such as hydrogenated edible oils and fats, cotton seed oil, other edible oils, linseed oil, palm oil, glycerin 12-hydorxystearate, hydrogenated fish oils, spermaceti wax, montan wax, carnauba wax, bees wax, haze wax and esters of monohydric alcohols with aliphatic saturated acids, e.g. hardened whale oil lauryl stearate and stearyl stearate.

(8) Alkali metal, alkaline earth metal, zinc and aluminum salts of higher fatty acids (metal soaps).

(9) Low-molecular-weight olefin resins such as low-molecular-weight polyethylene, low-molecular-weight polypropylene and oxidized polyethylene.

(10) Fluorine resins such as polytetrafluoroethylene, tetrafluoroethylene/hexafluoroethylene copolymers, polychlorotrifluoroethylene and polyvinyl fluoride.

(11) Other lubricants such as propylene glycol arginate, dialkyl ketones and acryl copolymers (for example, Modaflow manufactured by Monsanto Co.).

These lubricants are incorporated in amounts of 0.01 to 10% by weight, preferably 0.05 to 5% by weight, especially preferably 0.1 to 1.0% by weight, based on the thermoplastic resin.

Known additives may be incorporated at known mixing ratios into thermoplastic resin that is used in the present invention. For example, white and coloring pigments such as titanium white and carbon black, fillers such as calcium carbonate, white carbon and clay, antioxidants, plasticizers, antistatic agents and thermal stabilizers.

The form of the molten resin fed into the vessel closure shell is not particularly critical. For example, the molten resin may be fed in the form of a pellet, a dice, a tablet, doughnut, a disc, a sphere, a semisphere or a strand.

The amount of the resin supplied into one closure shell may ordinarily be in the range of from 100 mg to 10 g, though the amount differs depending on the size of the shell.

The degree of spreading of the resin in the molten state is not particularly critical insofar as excessive in-plane orientation in the final liner is inhibited. Ordinarily, the molten resin is spread over an area corresponding to at least ⅛, preferably ¼, and especially preferably at least ½, of the projection area of the final liner. The spreading operation using a hot press may be carried out in one stage or in two stages.

Figure 5:
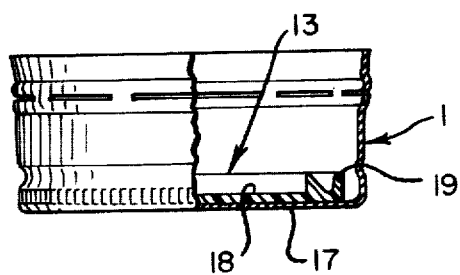
FIG. 5 is a partial sectional side view illustrating a closure cap according to the present invention in the form of a pilfer-proof cap.

The process of the present invention is especially advantageously applied to the manufacture of broad closure caps having liners, for example, the wide mouthed pilfer-proof cap shown in FIG. 5. Referring to FIG. 5, the closure cap comprises a wide mouthed cap shell 1 and a liner 13 composed of a lubricant containing thermoplastic resin composition which is thermally bonded to the inner face of the top plate of the shell 1 through an appropriate primer coating (not shown). The liner 13 comprises a relatively thin central portion 18 and a relatively thick peripheral seal portion 19. According to the molding process of the present invention, the distribution of the lubricant in the surface of the central portion 18 which is subject to contacting the contents of a container is reduced but the distribution of the lubricant in the surface of the peripheral portion 19 subject to contact with a bottle mouth is increased. Therefore, a further advantage obtained from using our process is that the opening torque can be reduced while at the same time migration of the lubricant into the content of the container is controlled. The reason why such specific distribution of the lubricant is attained according to the present invention is not completely understood. However, it is believed that if the resin in the molten state is first spread and is then press molded while being cooled, crystallization of the resin is inhibited in the thin central portion 18 by rapid cooling to control blooming of the lubricant in the central portion 18, while in the thick peripheral portion 19, since the portion 19 is gradually cooled, crystallization of the resin is advanced and blooming of the lubricant is caused to occur.

Figure 6:
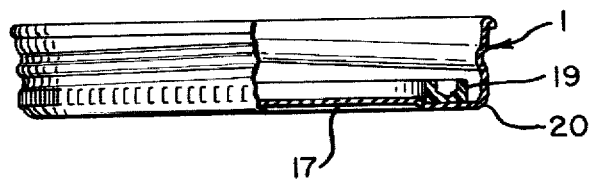
FIG. 6 is a partial sectional side view illustrating a further form of a closure cap according to the present invention in the form of a screw cap.

In a closure cap according to the present invention, as in the case of a screw cap shown in FIG. 6, a liner 19 may be applied only to a peripheral annular concave portion 20 of a cap shell 1. In this case, resin is positioned in the concave portion 20 in the form of one or more drops or masses or of a continuous ring, and the melting spreading operation and the cooling molding operation are carried out in the same manner as described above.

Various changes and modifications may be made to the above-mentioned embodiments of the present invention without departing from the spirit of the present invention. For example, a projecting rib or concave groove having an optional sectional shape, which is preferred to attain a good seal, may be formed on the peripheral sealing portion of the liner, or both a projecting rib and a concave groove may be formed on the sealing peripheral portion. Also when a sealing peripheral portion having a complicated shape and a thickness much larger than the thickness of the central portion is formed, the intended effects of the present invention, that is, the effects of preventing formation of cracks and preventing degradation of the adhesion with the lapse of time, can be advantageously attained.

The present invention will now be described in detail with reference to the following Examples that by no means limit the scope of the invention.

EXAMPLE 1

An anti-corrosive primer lacquer comprising 70 parts by weight of a vnyl chloride-vinyl acetate copolymer, 25 parts by weight of a bisphenol A type epoxy resin and 5 parts by weight of an amino resin in an organic solvent was roll coated on an aluminum plate having a thickness of 0.24 mm (manufactured by Sumitomo Keikinzoku Kogyo Kabushiki Kaisha) and the coated aluminum plate was heated at 190° C. for 10 minutes to form an anti-corrosive primer lacquer layer. A primer composition comprising 70 parts by weight of an epoxy resin, 10 parts by weight of an urea resin and 20 parts by weight of maleic acid modified polyethylene in an organic solvent was coated as an adhesive paint on the so-formed lacquer layer and the coating was heated at 200° C. for 10 minutes to form a coated plate. Then the coated plate was shaped into a cap shell having a diameter of 28 mm so that the coated surface was located on the inner side. The cap shell formed (ordinarily called a "28 mm PP cap") was then heated at 190° C. by a high frequency heating device and a molten liner material under conditions shown in Table 1 was then fed to the inner side of the heated cap shell by an extruder, while cutting the molten resin into a small mass by a rotary cutter.

A homogeneous blend comprising 95 parts by weight of high denisty polyethylene (HDPE) having a density of 0.92 and a melt index (M.I.) of 8.0, 5 parts by weight of butyl rubber, 0.5 part by weight of stearic acid amide as a lubricant and 0.5 part by weight of stearic acid monoglyceride was used as the starting liner forming material.

The small mass of the molten resin was pressed (spread) into a predetermined thickness by a first press mold under conditions shown in Table 1, and was then further pressed by a second press mold to form a liner provided cap. The liner molding conditions are shown in Table 1.

The cap obtained was tested and evaluated according to the following methods.

Test (1): Difference of In-plane Orientation Index and Balance Difference

The liner was peeled off from each cap, the molecular orientation coefficient l (in the radial direction) and the molecular orientation coefficient m (in the circumferential direction) were determined with respect to each of the central portion of the liner and the peripheral portion (the portion in contact with an annular projection closer to the central portion of the cap) of the liner according to the polarimetric fluorometric method (FOM). From these coefficients, the in-plane orientation index difference and the balance difference were calculated according to the following formulae:

In-plane orientation index difference $= I_O{}^P - I_O{}^C$

Balance difference $= D_B{}^P - D_B{}^C$ $I_O$: $l + m$ $I_O{}^P$: in-plane orientation index in the peripheral portion of the liner $I_O{}^C$: in-plane orientation index in the central portion of the liner $D_B$: $[l - m]$ $D_B{}^P$: balance in the peripheral portion of the liner $D_B{}^C$: balance in the central portion of the liner

Test (2): Peel Strength

The peel strength between the liner and the cap was determined at a peeling speed of 50 mm/min, a temperature of 20° C. and a peeling angle of 90° by using a Tensilon tensile tester.

Test (3): Resistance to Stress Cracking

A 0.1% soution of Liponox (trademark for a non-ionic surface active agent manufactured by Lion Yushi Kabushiki Kaisha) was used as a cracking promotor and maintained at 50° C. in a thermostat tank. The side face of the cap shell was removed and the cap was bent by 90° so that the liner portion was located on the front side. The cap was dipped in the 0.1% solution of Liponox and the surface of the liner was observed by a microscope. The time (F50) required for formation in cracks in 50% of tested samples was measured.

Test (4): Adaptability to Operation

The operation adaptability was evaluated based on the molding and adhesion state of the cap having a liner in the shell of a predetermined shape (a convex annular shape capable of pressing a bottle mouth from the inner and outer sides thereof).

Test (5): Durable Pressure Resistance

Dilute sulfuric acid was prepared by diluting 40.5 g of concentrated sulfuric acid (98%) of 7.57 l of water, and 100 ml of this dilute sulfuric acid was charged in a bottle having a capacity of 110 ml. Then 1.5 g of sodium hydrogen-carbonate wrapped with paper was put into the bottle so that it was not brought into contact with the sulfuric acid solution, and the sample cap was attached to the mouth of the bottle. Then the sodium hydrogen-carbonate was completely dissolved in the solution. The bottle was placed in warm water maintained at 65° C. and kept in this state for 1 hour at 65° C. The number of bottles where gas leakage was caused was counted.

Test (6): Opening Torque

A sample cap was attached to the mouth of a bottle using the procedures of Test 5 and the sodium hydrogencarbonate was completely dissolved in the sulfuric acid solution. The bottle was then allowed to stand still for 24 hours and the opening torque value was measured by a torque meter.

The obtained results are shown in Table 2.

TABLE 1

| Molding Conditions | Sample | Resin Temperature | Shell Temperature | Hot Pressing | | Cold Pressing | |
|---|---|---|---|---|---|---|---|
| | | | | First Press Mold Surface Temperature | First Anvil Surface Temperature | Second Press Mold Surface Temperature | Second Anvil Surface Temperature |
| i | 1 | 200 C. | 190 C. | 120 C. | 120 C. | 20 C. | 20 C. |
| (pre- | 2 | 150 C. | 150 C. | 120 C. | 120 C. | 20 C. | 20 C. |
| sent | 3 | 200 C. | 190 C. | 120 C. | 20 C. | 20 C. | 20 C. |
| inven- | 4 | 150 C. | 150 C. | 180 C. | 20 C. | 20 C. | 20 C. |
| tion) | 5 | 150 C. | 150 C. | 120 C. | 20 C. | 20 C. | 20 C. |

TABLE 1-continued

| Molding Conditions | Sample | Resin Temperature | Shell Temperature | Hot Pressing | | Cold Pressing | |
|---|---|---|---|---|---|---|---|
| | | | | First Press Mold Surface Temperature | First Anvil Surface Temperature | Second Press Mold Surface Temperature | Second Anvil Surface Temperature |
| | 6 | 150 C. | 150 C. | 90 C. | 20 C. | 20 C. | 20 C. |
| | 7 | 150 C. | 150 C. | 60 C. | 20 C. | 20 C. | 20 C. |
| 2 (comparison) | 1 | 200 C. | 190 C. | ---- | ---- | 20 C. | 20 C. |
| | 2 | 150 C. | 150 C. | — | — | 20 C. | 20 C. |

TABLE 2

| Molding Conditions | Sample | Operation Adaptability | In-Plane Orientation Index Difference $(I_o^P - I_o^C)$ | Balance Difference $(D_B^P - D_B^C)$ | Peel Strength (kg) | Stress Cracking Resistance F50 (hours) | Opening Torque (kg-m) | Durable Pressure Resistance (bottles) |
|---|---|---|---|---|---|---|---|---|
| 1 (Present Invention) | 1 |  | 0.08 | 0.09 | 6.5 | >48 | 7.0 | 0 |
| | 2 |  | 0.10 | 0.08 | 6.1 | >48 | 7.0 | 0 |
| | 3 | O | 0.12 | 0.10 | 6.0 | 36 | 8.0 | 0 |
| | 4 | O | 0.11 | 0.16 | 5.5 | 26 | 7.0 | 0 |
| | 5 | O | 0.13 | 0.12 | 5.3 | 23 | 9.0 | 0 |
| | 6 | Δ | 0.21 | 0.18 | 5.3 | 14 | 9.0 | 0 |
| | 7 | X | 0.36 | 0.41 | 3.5 | 13 | 9.0 | 0 |
| 2 (Comparison) | 1 | Δ | 0.30 | 0.21 | 1.3 | 15 | 15.0 | 0 |
| | 2 | X | 0.55 | 0.45 | 0.5 | 0.5 | 17.0 | 2 |

Note:
: good adhesion and precisely formed annular shape.
O: good adhesion but relatively incomplete annular shape.
Δ: slight peeling in the peripheral portion of the liner and incomplete annular shape.
X: prominent peeling in the peripheral portion of the liner.

EXAMPLE 2

An aluminum plate having a thickness of 0.25 mm (JIS 1100, manufactured by Sumitomo Keikinzoku Kabushiki Kaisha) was coated in the same manner as described in Example 1 and the coated plate was formed into a cap shell having a diameter of 53 mm and a height of 18 mm (ordinarily called "53 mm pp cap") so that the coated surface was located on the inner side.

The cap shell was then heated at 190° C. by a high frequency heating device and polyethylene shown in Table 4 was extruded under molding conditions shown in Table 3 and cut into a small mass (1.4 g) by a rotary cutter. The small mass of the molten resin was put into the central portion of the inner side of the heated cap shell and molded into a liner having a shape shown in FIG. 5 by a press mold under the conditions shown in Table 3. The molding conditions and the used polyethylene are shown in Tables 3 and 4, respectively.

The cap formed was tested according to the following methods.

Test (1): In-plane Orientation Index Difference and Balance Difference

The liner was peeled off from the cap and the in-plane orientation index difference $(I_o^P - I_o^C)$ and the balance difference $(D_B^P - D_B^C)$ were determined with respect to the peeled liner in the same manner as described in Example 1.

The cap with the liner was attached to a bottle including a mouth having a dimension shown in FIG. 5 (the unit being mm) and having a capacity of 1000 ml. The following properties were determined.

Test (2): Peel Strength

The peel strength between the liner and the cap was determined in the same manner as described in Example 1.

Test (3): Durable Resistance to Reduced Pressure

Warm water maintained at 80° to 85° C. was charged in a 1-liter bottle having a mouth for a 53 mm pp cap, and the bottle was immediately sealed with the sample cap by a sealing machine and allowed to stand still at room temperature for 1 day. The degree of vacuum was measured by a vacuum can tester.

Test (4): Resistance to Stress Cracking

The side screw portion of the cap was removed and the cap was bent by 90° so that the liner portion was located on the front side, and the cap was dipped in a cracking promotor (a 0.1% solution of Liponox) all in the same manner as described in Example 1. The liner was observed by a microscope and the time required for formation of cracks in 50% of the tested samples was determined.

Test (5): Opening Torque

Warm water was charged in the bottle under the same conditions as described in Test (1) and the bottle was allowed to stand still for 1 day. The opening torque value was measured by a torque meter.

The obtained results are shown in Table 5.

TABLE 3

| Molding Conditions | Resin Temperature | Shell Temperature | Hot Pressing | | Cold Pressing | |
|---|---|---|---|---|---|---|
| | | | First Press Mold Surface Temperature | First Anvil Surface Temperature | Second Press Mold Surface Temperature | Second Anvil Surface Temperature |
| 1 Present Invention | 200 C. | 190 C. | 130 C. | 130 C. | 20 C. | 20 C. |
| 1 Comparison | 200 C. | 190 C. | — | — | 20 C. | 20 C. |
| 2 Present Invention | 150 C. | 190 C. | 130 C. | 130 C. | 20 C. | 20 C. |
| 2 Comparison | 150 C. | 190 C. | — | — | 20 C. | 20 C. |

TABLE 4

| Sample No. | Melt Index (g/10 min) | Density (g/cc) |
|---|---|---|
| 1 | 0.2 | 0.922 |
| 2 | 2.0 | 0.918 |
| 3 | 10.0 | 0.917 |
| 4 | 20.0 | 0.916 |

TABLE 5

| Molding Conditions | Sample No. | In-Plane Orientation Index Difference $(I_o^P - I_o^C)$ | Balance Difference $(D_B^P - D_B^C)$ | Peel Strength (kg) | Stress Cracking Resistance F50 (hours) | Opening Torque (kg-cm) | Durable Resistance to Reduced Pressure (cmHg) |
|---|---|---|---|---|---|---|---|
| 1 Present Invention | 1 | 0.14 | 0.16 | 6.6 | >48 | 17.0 | 46 |
| | 2 | 0.11 | 0.09 | 6.7 | >48 | 17.5 | 47 |
| | 3 | 0.06 | 0.07 | 6.3 | >48 | 18.5 | 46 |
| | 4 | 0.09 | 0.08 | 5.9 | 22 | 18.5 | 46 |
| 1 Comparison | 1 | 0.49 | 0.49 | 1.4 | 2.2 | 25.0 | 13 |
| | 2 | 0.47 | 0.51 | 1.8 | 1.3 | 25.0 | 19 |
| | 3 | 0.46 | 0.47 | 1.3 | 2.3 | 27.0 | 33 |
| | 4 | 0.48 | 0.45 | 1.4 | 1.3 | 26.0 | 31 |
| 2 Present Invention | 1 | 0.18 | 0.17 | 6.4 | >48 | 17.5 | 47 |
| | 2 | 0.16 | 0.15 | 6.3 | >48 | 17.5 | 44 |
| | 3 | 0.12 | 0.14 | 5.9 | 38 | 17.5 | 46 |
| | 4 | 0.11 | 0.11 | 5.9 | 20 | 18.0 | 48 |
| 2 Comparison | 1 | 0.56 | 0.53 | 0.38 | 4.1 | 38.0 | 13 |
| | 2 | 0.51 | 0.50 | 0.34 | 3.8 | 37.5 | 15 |
| | 3 | 0.50 | 0.51 | 0.56 | 1.4 | 30.5 | 10 |
| | 4 | 0.51 | 0.48 | 0.55 | 0.5 | 42.0 | 16 |

EXAMPLE 3

An aluminum plate having a thickness of 0.25 mm (5052 manufactured by Furukawa Aluminum Kogyo Kabushiki Kaisha) was coated in the same manner as described in Example 1 to form a coated plate.

A vinyl-phenol paint for a polyvinyl chloride liner was roll coated separately on the same aluminum plate as used in Example 2 and heated at 190° C. for 10 minutes. For a polypropylene liner, a coated plate was prepared in the same manner as described in Example 1 except that the modified polyethylene in the paint used in Example 1 was replaced by maleic acid modified polypropylene.

Each of the coated plates was formed into a cap shall having a diameter of 38 mm and a height of 18 mm (ordinarily called "38 mm pp cap") so that the coated surface was located on the inner side.

The cap shell was heated at 190° C. by a high frequency heating device and under molding conditions shown in Table 6, a resin shown in Table 7 was extruded from an extruder and cut by a rotary cutter into a small molten resin mass (0.4 g). The small molten resin mass was then positioned into the central portion of the inner side of the cap shell and immediately pressed by a press mold under the conditions shown in Table 6 to form a cap provided with a liner.

Various caps having liners were similarly prepared under the molding conditions shown in Table 6 by using the thermoplastic resins shown in Table 7. The above-mentioned caps having a coating for polyvinyl chloride and having a coating for polypropylene were used for formation of polyvinyl chloride and polypropylene liners, respectively. In case of resin blends of samples Nos. 5 to 14 shown in Table 7, the respective components were molten and mixed by a customary kneader and the resulting homogenous composition was molded into pellets.

Each of the caps formed was tested according to the methods described in Example 1 to obtain results shown in Table 8. Since the caps prepared in this Example were pressure resistant caps (for packing of gases), the instantaneous pressure resistance was also determined according to the following method. Instantaneous Pressure Resistance Test:

A bottle for a 38 mm pp cap having a capacity of 1100 ml was charged with 1000 ml of water and sealed with the cap sample and the instantaneous pressure resistance was measured by a proper application tester (Model 490 manufactured by Alcore Co.).

PP: polypropylene (M.I.=25, density=0.91)
EVA: ethylene-vinyl acetate copolymer (vinyl acetate content=19%, M.I.=2.5)
PVC: soft polyvinyl chloride resin comprising 100 parts by weight of polyvinyl chloride, 60 parts by weight of a plasticizer (DOP) and 2 parts by weight of a thermal stabilizer
LDPE: polyethylene (density=0.921, M.I.=2.7)
PIB: polyisobutylene rubber (Vistanex LLM-100 manufactured by Esso Chemical Co.)
EP: ethylene-propylene copolymer (propylene content=26%, M.I.=2.6)
SIS: styrene-isoprene-styrene block copolymer (Cariflex TR-1107 manufactured by Shell Chemical Co.)
SBS: styrene-butadiene-styrene block copolymer (Cariflex TR-1102 manufactured by Shell Chemical Co.)
PE: polyester elastomer (Pelburen P-70B manufactured by Toyo Boseki Kabushiki Kaisha)
PB: 1,2-polybutadiene RB-820 manufactured by Nippon Gosei Gomu Kabushiki Kaisha
HDPE: high density polyethylene (density=0.960, M.I.=4.0)

TABLE 6

| Molding Conditions | Resin Temperature | Shell Temperature | Hot Pressing | | Cold Pressing | |
|---|---|---|---|---|---|---|
| | | | First Press Mold Surface Temperature | First Anvil Surface Temperature | Second Press Mold Surface Temperature | Second Anvil Surface Temperature |
| 1 (Present Invention) | 200 C. | 190 C. | 150 C. | 150 C. | 20 C. | 20 C. |
| 2 (Comparison) | 200 C. | 190 C. | — | — | 20 C. | 20 C. |
| 3 (Comparison) | 250 C. | 190 C. | — | — | 20 C. | 20 C. |

TABLE 7

| Sample No. | Resin Composition |
|---|---|
| 1 | PP |
| 2 | EVA |
| 3 | PVC |
| 4 | LDPE |
| 5 | LDPE(90)-PIB(10) |
| 6 | LDPE(90)-EP(10) |
| 7 | LDPE(70)-EP(30) |
| 8 | (LDPE(90)-PB(10) |
| 9 | LDPE(90)-SIS(10) |
| 10 | LDPE(90)-SBS(10) |
| 11 | LDPE(70)-EP(20)-SIS(10) |
| 12 | LDPE(70)-EP(20)-SBS(10) |
| 13 | HDPE(70)-PE(30) |
| 14 | HDPE(90)-EVA(10) |

With respect to Table 7:
Each parenthesized value indicates the weight ratio (parts by weight) of the component.

TABLE 8

| Molding Conditions | Sample No. | In-Plane Orientation Index Difference ($I_o^P - I_o^C$) | Balance Difference ($D_B^P - D_B^C$) | Peel Strength (kg) | Stress Cracking Resistance F50 (hours) | Opening Torque (kg-cm) | Instantaneous Pressure Resistance (kg/cm$^2$) |
|---|---|---|---|---|---|---|---|
| 1 (Present Invention) | 1 | 0.22 | 0.19 | 5.06 | 30 | 14.0 | >11 |
| | 2 | 0.01 | 0.01 | 7.14 | >48 | 17.5 | >11 |
| | 3 | 0.01 | 0.01 | 6.95 | >48 | 16.5 | >11 |
| | 4 | 0.12 | 0.10 | 4.85 | 35 | 12.0 | >11 |
| | 5 | 0.09 | 0.13 | 4.77 | >48 | 18.0 | >11 |
| | 6 | 0.07 | 0.04 | 7.99 | >48 | 14.0 | >11 |
| | 7 | 0.03 | 0.04 | 7.89 | >48 | 14.0 | >11 |
| | 8 | 0.08 | 0.11 | 5.67 | >48 | 17.0 | >11 |
| | 9 | 0.03 | 0.02 | 4.85 | >48 | 18.0 | >11 |
| | 10 | 0.03 | 0.04 | 5.25 | >48 | 17.5 | >11 |
| | 11 | 0.01 | 0.01 | 6.63 | >48 | 16.5 | >11 |
| | 12 | 0.01 | 0.01 | 6.87 | >48 | 18.0 | >11 |
| | 13 | 0.13 | 0.16 | 4.11 | >48 | 14.0 | >11 |
| | 14 | 0.15 | 0.19 | 4.59 | >48 | 17.0 | >11 |
| 2 (Comparison) | 1 | 0.69 | 0.57 | 0.12 | 3.6 | 34 | 4.3 |
| | 2 | 0.39 | 0.33 | 1.01 | >48 | 38 | 9.7 |
| | 3 | 0.38 | 0.31 | 0.14 | >48 | 27 | 10.1 |
| | 4 | 0.41 | 0.39 | 0.35 | 2.6 | 26 | 5.7 |
| | 5 | 0.40 | 0.37 | 0.19 | 2.8 | 31 | 6.3 |
| | 6 | 0.39 | 0.38 | 0.84 | 3.1 | 34 | 7.2 |
| | 7 | 0.38 | 0.38 | 0.83 | 2.8 | 30 | 7.7 |
| | 8 | 0.39 | 0.41 | 0.21 | 3.4 | 28 | 6.4 |
| | 9 | 0.39 | 0.37 | 0.65 | 3.9 | 33 | 6.5 |
| | 10 | 0.38 | 0.35 | 0.39 | 3.3 | 35 | 6.9 |

TABLE 8-continued

| Molding Conditions | Sample No. | In-Plane Orientation Index Difference ($I_o^P-I_o^C$) | Balance Difference ($D_B^P-D_B^C$) | Peel Strength (kg) | Stress Cracking Resistance F50 (hours) | Opening Torque (kg-cm) | Instantaneous Pressure Resistance (kg/cm$^2$) |
|---|---|---|---|---|---|---|---|
| | 11 | 0.40 | 0.34 | 0.75 | 3.8 | 33 | 8.8 |
| | 12 | 0.37 | 0.33 | 0.75 | 3.9 | 38 | 7.6 |
| | 13 | 0.46 | 0.44 | 0.11 | 2.9 | 31 | 3.9 |
| | 14 | 0.43 | 0.46 | 0.15 | 3.5 | 27 | 3.5 |
| 3 (Comparison) | 1 | 0.55 | 0.47 | 0.16 | 3.3 | 30 | 5.5 |
| | 2 | 0.38 | 0.31 | 1.35 | >48 | 35 | 9.7 |
| | 3 | 0.37 | 0.34 | 0.26 | >48 | 27 | 10.3 |
| | 4 | 0.40 | 0.35 | 0.56 | 3.5 | 26 | 8.2 |
| | 5 | 0.38 | 0.32 | 0.33 | 2.9 | 30 | 5.9 |
| | 6 | 0.37 | 0.38 | 0.99 | 3.0 | 31 | 7.0 |
| | 7 | 0.38 | 0.33 | 0.89 | 3.1 | 26 | 7.9 |
| | 8 | 0.38 | 0.40 | 0.35 | 3.2 | 26 | 7.3 |
| | 9 | 0.37 | 0.36 | 0.71 | 3.9 | 31 | 7.8 |
| | 10 | 0.36 | 0.33 | 0.55 | 3.5 | 31 | 7.3 |
| | 11 | 0.40 | 0.32 | 0.85 | 3.9 | 30 | 9.2 |
| | 12 | 0.37 | 0.33 | 0.93 | 3.7 | 29 | 7.9 |
| | 13 | 0.41 | 0.45 | 0.37 | 3.4 | 30 | 4.5 |
| | 14 | 0.40 | 0.44 | 0.21 | 3.8 | 23 | 4.7 |

EXAMPLE 4

The same aluminum plate as used in Example 2 was coated in the same manner as described in Example 1 to form a coated plate. The coated plate was formed into a cap shell as shown in FIG. 5 by customary procedures so that the coated surface was located on the inner side of the cap shell. Under conditions shown in Table 9, the cap shell was heated by the same heating device as used in example 2, and a blend resin (homogeneous composition comprising 65 parts by weight of polyethylene having a density of 0.920 and a melt index of 1.5, 25 parts by weight of an ethylene-propylene copolymer having a propylene content of 9%, 10 parts by weight of a styrene-butadienestyrene block copolymer, 0.5 part by weight of stearic acid amide and 6 parts by weight of titanium white) was melted and a mass of the molten resin blend was supplied to the inner side of the cap in the same manner as described in Example 2 under conditions shown in Table 10. Liner molding conditions and amounts fed of the molten resin blend are shown in Tables 9 and 10.

The so-obtained liner provided caps were tested to obtain results shown in Table 11.

TABLE 9

| Molding Conditions | Resin Temperature | Shell Temperature | Hot Pressing | | Cold Pressing | |
|---|---|---|---|---|---|---|
| | | | First Press Mold Surface Temperature | First Anvil Surface Temperature | Second Press Mold Surface Temperature | Second Anvil Surface Temperature |
| 1 (Present Invention) | 200 C. | 190 C. | 120 C. | 120 C. | 20 C. | 20 C. |
| 2 (Comparison) | 200 C. | 190 C. | — | — | 20 C. | 20 C. |
| 3 (Present Invention) | 150 C. | 190 C. | 120 C. | 120 C. | 20 C. | 20 C. |
| 4 (Comparison) | 150 C. | 190 C. | — | — | 20 C. | 20 C. |

TABLE 10

| Nominal Size of Cap (mm) | Amount Fed of Resin (g) | Inner Diameter of Cap (mm) |
|---|---|---|
| 16 | 0.15 | 14.85 |
| 18 | 0.2 | 15.90 |
| 28 | 0.4 | 25.20 |
| 38 | 0.7 | 34.95 |
| 63 | 2.0 | 58.75 |
| 82 | 5.0 | 75.95 |

TABLE 11

| Molding Conditions | Sample No. | In-Plane Orientation Index Difference ($I_o^P - I_o^C$) | Balance Difference ($D_B^P - D_B^C$) | Peel Strength (kg) | Stress Cracking Resistance F50 (hours) | Opening Torque (kg-cm) |
| --- | --- | --- | --- | --- | --- | --- |
| 1 (Present Invention) | 1 | 0.003 | 0.004 | 6.43 | >48 | 5 |
| | 2 | 0.002 | 0.005 | 6.88 | >48 | 5 |
| | 3 | 0.06 | 0.05 | 6.76 | >48 | 7 |
| | 4 | 0.15 | 0.11 | 5.95 | >48 | 13 |
| | 5 | 0.16 | 0.15 | 6.87 | >48 | 15 |
| | 6 | 0.22 | 0.27 | 5.77 | >48 | 21 |
| 2 (Comparison) | 1 | 0.40 | 0.31 | 1.33 | 1.5 | 10 |
| | 2 | 0.42 | 0.33 | 0.77 | 1.7 | 13 |
| | 3 | 0.45 | 0.40 | 0.72 | 1.3 | 15 |
| | 4 | 0.52 | 0.45 | 0.75 | 1.0 | 33 |
| | 5 | 0.58 | 0.56 | 0.21 | 1.1 | 38 |
| | 6 | 0.80 | 0.82 | 0.11 | 0.7 | 45 |
| 3 (Present Invention) | 1 | 0.005 | 0.009 | 6.40 | >48 | 5 |
| | 2 | 0.006 | 0.008 | 7.04 | >48 | 6 |
| | 3 | 0.07 | 0.03 | 6.66 | >48 | 6 |
| | 4 | 0.17 | 0.14 | 5.25 | >48 | 12 |
| | 5 | 0.19 | 0.18 | 6.55 | >48 | 13 |
| | 6 | 0.25 | 0.27 | 5.43 | >48 | 22 |
| 4 (Comparison) | 1 | 0.43 | 0.33 | 1.33 | 1.2 | 13 |
| | 2 | 0.44 | 0.38 | 0.75 | 1.1 | 14 |
| | 3 | 0.49 | 0.42 | 0.68 | 0.9 | 17 |
| | 4 | 0.57 | 0.48 | 0.73 | 0.7 | 35 |
| | 5 | 0.60 | 0.57 | 0.24 | 0.7 | 40 |
| | 6 | 0.88 | 0.85 | 0.13 | 0.4 | 47 |

EXAMPLE 5

A tinplate sheet having a thickness of 0.24 mm (manufactured by Shin-Nittetsu Kabushiki Kaisha) was coated in the same manner as described in Example 1 to form a coated plate. A screw cap having an inner diameter of 54 mm (ordinarily called "58 mm screw cap") was prepared from the coated plate so that the coated surface was located on the inner side.

The cap shell was heated at 190° C. by a high frequency heating device and under conditions shown in Table 12, a linear forming material was extruded and cut into small pellets having a predetermined weight (1.2 g when one pellet was supplied, 0.6 g when two pellets were supplied or 0.3 g when four pellets were supplied). The small pellets were immediately placed in the sealing portion of the inner face of the cap adapted to be in contact with a bottle at predetermined intervals and the pellets were formed into a liner under conditions shown in Table 12 to obtain a cap having a liner. The liner forming material used was a homogeneous composition comprising 60 parts by weight of polyethylene having a density of 0.920 and a melt index of 15, 20 parts by weight of an ethylene-propylene copolymer having a propylene content of 10%, 20 parts by weight of polyisobutylene, 3 parts by weight of oleic acid amide, 1 part by weight of a silicone oil (1000 CS) and 1.2 parts by weight of a coloring agent and a metal soap.

The cap prepared in this Example was different from the caps prepared in Examples 1 to 4 at the point where an annular liner is applied to a cap shell.

Results of the evaluation made on the liner provided cap are shown in Table 13.

TABLE 12

| Molding Condition | Resin Temperature | Shell Temperature | Surface Temperature at Hot Pressing | | Surface Temperature at Cold Pressing | |
| --- | --- | --- | --- | --- | --- | --- |
| | | | Pressing Mold | Anvil | Pressing Mold | Anvil |
| 1 (Present Invention) | 200 C. | 190 C. | 130 C. | 130 C. | 20 C. | 20 C. |
| 2 (Comparison) | 200 C. | 190 C. | — | — | 20 C. | 20 C. |

TABLE 13

| Molding Conditions | Number of Applied Pellets | Evaluation of Annular Liner | State of Formation of Annular Liner |
| --- | --- | --- | --- |
| 1 (Present Invention) | one | Δ | cracks in welded portion |
| (Comparison) | one | X | no annular liner formed |
| 2 (Present Invention) | two | O | good annular shape |
| (Comparison) | two | X | no annular liner formed |
| 3 (Present Invention) | four | | very good annular shape |
| (Comparison) | four | Δ | cracks in welded portion |

Note:
: good adhesion and precisely formed annular shape.
O: good adhesion but relatively incomplete annular shape.
Δ: slight peeling in the peripheral portion of the liner and incomplete annular shape
X: prominent peeling in the peripheral portion of the liner.

EXAMPLE 6

An aluminum plate was coated and formed into a cap shell in the same manner as described in Example 1. A liner was formed on the cap shell by press molding under heating in the same manner as described in Example 1. Influences of the material of the heating pressing mold on the state of parting of the liner forming resin pellet from the surface of the pressing mold were examined.

Low density polyethylene having a melt index of 7.5 and a density of 0.92 was used as the liner forming resin.

The heating pressing time was to 2 seconds and the state of sticking of the resin to the pressing mold was examined and the results obtained are shown in Table 14.

TABLE 14

| Material of Pressing Mold | Temperature (°C.) | | | | | |
|---|---|---|---|---|---|---|
|  | 40 | 80 | 120 | 160 | 200 | 240 |
| Teflon (polytetrafluoroethylene) | O | O | O | O | O | O |
| Silicone (organopolysiloxane) | O | O | O | O | Δ | Δ |
| Meldin (polyimide) | Δ | X | X | X | X | X |
| Rulon (polytetrafluoroethylene plus filler) | O | Δ | Δ | X | X | X |
| Zytel (nylon 66) | O | Δ | X | X | X | X |
| Teflox (Teflon-coated metal) | O | O | O | O | O | O |
| Super-hard steel | O | Δ | X | X | X | X |
| Hizex Million (high density polyethylene) | O | Δ | X | X | X | X |

Note:
O: good parting property
Δ: local sticking
X: sticking on the entire surface or at least one-half the entire surface.

We claim:

1. A process for the manufacture of a closure cap having a shell and a liner comprising the steps of positioning a melt in the shell of a thermoplastic resin composition containing 0.01 to 10% by weight based on the resin of a lubricant, pressing the melt by a punch maintained at a high temperature to spread the melt on the inner face of the shell, and press-molding the spread melt by a cooled punch to form a liner in which the thickness of the sealing peripheral portion of the liner is larger than the thickness of the central portion of the liner wherein blooming of the lubricant is caused to occur on the surface of said peripheral portion and is inhibited on the surface of said central portion.

2. A process for the manufacture of a closure cap according to claim 1 including the additional step of coating said inner face with a primer coating layer prior to the step of positioning the mass of molten resin in said inner face whereby said resin may be thermally bonded to said shell.

3. A process according to claim 2 wherein said resin is an olefin resin, said shell is metal, and said coating layer is a paint obtained by dispersing an oxidized polyethylene or acid modified olefin resin in a film forming resin.

4. A process according to claim 3 wherein the olefin resin comprises a low density polyethylene having a melt index of 0.1 to 20 g/10 min.

5. A process according to claim 4 wherein the low density polyethylene contains an ethylene-propylene copolymer or thermoplastic elastomer as a modifying component in an amount of 3 to 40% by weight based on the weight of the polyethylene.

6. A process according to claim 1 including the additional step of maintaining the surface temperature of the heated punch higher than the Vicat temperature of the resin.

7. A process according to claim 1 including the additional step of spreading the resin by the heated punch to an area equal to at least ⅓ of the area of the liner to be formed.

8. A process according to claim 1 wherein the step of positioning said mass on the inner face of a shell includes positioning a plurality of small masses applied to the inner face to form an annular ring of resin on the inner face.

* * * * *